`US010266915B2`

United States Patent
Paranthaman et al.

(10) Patent No.: US 10,266,915 B2
(45) Date of Patent: Apr. 23, 2019

(54) COMPOSITION FOR RECOVERY OF LITHIUM FROM BRINES, AND PROCESS OF USING SAID COMPOSITION

(71) Applicants: UT-Battelle, LLC, Oak Ridge, TN (US); Alger Alternative Energy, LLC, Brawley, CA (US)

(72) Inventors: Mariappan Parans Paranthaman, Knoxville, TN (US); Ramesh R. Bhave, Knoxville, TN (US); Bruce A. Moyer, Oak Ridge, TN (US); Stephen Harrison, Benicia, CA (US)

(73) Assignees: UT-Battelle, LLC, Oak Ridge, TN (US); Alger Alternative Energy, LLC, Brawley, CA (US)

( * ) Notice: Subject to any disclaimer, the term of this patent is extended or adjusted under 35 U.S.C. 154(b) by 129 days.

(21) Appl. No.: 15/099,045

(22) Filed: Apr. 14, 2016

(65) Prior Publication Data
US 2017/0298475 A1    Oct. 19, 2017

(51) Int. Cl.
| | |
|---|---|
| *C22B 26/12* | (2006.01) |
| *B01J 39/10* | (2006.01) |
| *C01B 39/50* | (2006.01) |
| *B01J 39/02* | (2006.01) |
| *C22B 3/42* | (2006.01) |
| *B01J 39/14* | (2006.01) |
| *B01J 20/08* | (2006.01) |
| *B01J 20/18* | (2006.01) |
| *C22B 7/00* | (2006.01) |

(52) U.S. Cl.
CPC ............... *C22B 26/12* (2013.01); *B01J 20/08* (2013.01); *B01J 20/18* (2013.01); *B01J 39/02* (2013.01); *B01J 39/10* (2013.01); *B01J 39/14* (2013.01); *C01B 39/50* (2013.01); *C22B 3/42* (2013.01); *C22B 7/006* (2013.01)

(58) Field of Classification Search
CPC ... B01J 20/08; B01J 20/18; B01J 39/10; B01J 39/14; C01B 39/50; C22B 26/12; C22B 7/006; C22B 3/42
See application file for complete search history.

(56) References Cited

U.S. PATENT DOCUMENTS

| | | | |
|---|---|---|---|
| 4,348,295 A | 9/1982 | Burba, III | |
| 4,461,714 A | 7/1984 | Burba, III | |
| 5,529,686 A | 6/1996 | Hagen et al. | |
| 6,280,693 B1* | 8/2001 | Bauman | C01D 15/04 252/184 |
| 8,637,428 B1* | 1/2014 | Harrison | B01J 20/041 423/179.5 |
| 8,753,594 B1 | 6/2014 | Burba, III et al. | |
| 8,901,032 B1 | 12/2014 | Harrison et al. | |
| 9,012,357 B2 | 4/2015 | Harrison et al. | |
| 9,034,295 B2 | 5/2015 | Harrison | |
| 9,074,265 B2 | 7/2015 | Harrison et al. | |
| 2012/0141342 A1 | 6/2012 | Alurralde et al. | |
| 2014/0170041 A1* | 6/2014 | Harrison | C02F 1/52 423/185 |
| 2014/0239221 A1* | 8/2014 | Harrison | C09K 5/10 252/67 |
| 2014/0239224 A1 | 8/2014 | Burba et al. | |

OTHER PUBLICATIONS

Alumina Trihydrate AB HD30, Global Product Data Sheet., (2010) ALMATIS (Year: 2010).*
C30 Bayer Hydrate—Hydrated Alumina, Product Information, (Apr. 2014), Alcoa World Alumina ) (Year: 2014).*

* cited by examiner

*Primary Examiner* — David M Brunsman
(74) *Attorney, Agent, or Firm* — Scully Scott Murphy & Presser

(57) ABSTRACT

A solid particulate composition useful in extracting a lithium salt from aqueous solutions, the composition comprising lithium, metal atoms, oxygen atoms, and at least one anionic species (X) selected from halide, nitrate, sulfate, carbonate and bicarbonate, all in a framework structure, wherein said metal atoms are selected from at least one of oxophilic main group metal and oxophilic transition metal atoms, provided that, if the metal atoms comprise aluminum atoms, then at least 10 mol % of said aluminum atoms are substituted with at least one metal atom selected from said at least one oxophilic main group and oxophilic transition metal atoms, other than aluminum, and wherein said lithium is present in said composition in an amount less than a saturated amount in order to permit extraction of lithium salt. Methods for extracting and recovering a lithium salt from an aqueous solution by use of the above-described composition are also described.

7 Claims, 3 Drawing Sheets

COMPOSITION FOR RECOVERY OF LITHIUM FROM BRINES, AND PROCESS OF USING SAID COMPOSITION

This invention was made with government support under Prime Contract No. DE-AC05-00OR22725 awarded by the U.S. Department of Energy. The government has certain rights in the invention.

FIELD OF THE INVENTION

The present invention relates, generally, to compositions for extracting lithium from aqueous solutions, and more particularly, to such compositions in which a lithium salt is incorporated within a metal oxide or metal hydroxide framework.

BACKGROUND OF THE INVENTION

Lithium is of growing importance as an element for use in a variety of applications, particularly lithium-ion batteries. Economically viable concentrations of lithium are typically found in brines, minerals, and clays in various parts of the world. At one time, lithium production was dominated by producers utilizing spodumene and pegmatite mineral deposits found in the United States. However, South America, Australia, and China currently account for the majority of lithium production.

While hard minerals, such as pegmatite, hectorite, and jaderite, still account for a significant fraction of lithium production, the majority is recovered from brines, such as continental, geothermal, and oilfield brines. Lithium recovery is typically accomplished using natural evaporative processes. In many instances, the primary product of such brine processing is potassium, with lithium being produced as a side product.

Geothermal brines are of particular interest for a variety of reasons. First, some geothermal brines provide a source of electrical power due to the fact that hot geothermal pools are stored at high pressure underground, which, when released to atmospheric pressure, can provide a flash-steam. The flash-steam can be used, for example, to generate electrical power. In some geothermal waters and brines, associated binary processes can be used to heat a secondary fluid, which can provide steam for the generation of electricity without the flashing of the geothermal brine. Additionally, geothermal brines contain a variety of useful elements, which can be recovered and utilized for secondary processes.

It is known that geothermal brines can include various metal ions, particularly alkali and alkaline earth metals, as well as transition metals, such as lead, silver and zinc, in varying concentrations, depending upon the source of the brine. Recovery of these metals is potentially important to the chemical and pharmaceutical industries. Typically, the economic recovery of metals from natural brines, which may vary widely in composition, depends not only on the specific concentration of the desired metal, but also upon the concentrations of interfering ions, particularly silica, calcium and magnesium, as the presence of such interfering ions will increase recovery costs as additional steps must be taken for their removal.

As lithium has gained importance as an element for use in various applications, there are continuing efforts to develop simple and inexpensive methods for the recovery of lithium. In particular, there have been significant efforts in the use of layered lithium aluminates, typically of the formula LiX/Al (OH)$_3$, such as described in, for example, U.S. Pat. Nos. 9,012,357, 8,901,032, 8,753,594, 6,280,693, 4,348,295, and 4,461,714. Unfortunately, such methods, which generally employ packed columns for the recovery, suffer from a number of drawbacks, such as shortened lifetimes due to the gradual deterioration and disintegration of the particles and collapse of the crystal structures. Lithium-manganese oxide compositions have also been used, but they tend to suffer from instability from the use of concentrated acid to recover lithium from the sorbent. There is a particular need for new compositions with enhanced lithium uptake and selectivity.

SUMMARY OF THE INVENTION

In one aspect, the invention is directed to a solid particulate composition useful in extracting lithium salt from brines, such as geothermal brines, and other aqueous solutions. The composition described herein may advantageously exhibit a high or improved lithium absorption capacity, lithium selectivity, and/or physical resiliency (i.e., resistance to collapse). The composition includes lithium, metal atoms, oxygen atoms, and at least one anionic species (X) selected from halide, nitrate, sulfate, carbonate and bicarbonate, all in a framework structure. The metal atoms are selected from at least one of oxophilic main group metal and oxophilic transition metal atoms, provided that, if the metal atoms comprise aluminum atoms, then at least 10 mol % of the aluminum atoms are substituted with at least one metal atom selected from the at least one oxophilic main group and oxophilic transition metal atoms, other than aluminum. Moreover, the lithium is present in the composition in an amount less than a saturated amount in order to permit extraction of the lithium salt.

In first particular embodiments, the composition is a framework structure comprising LiX and M(OH)$_z$ units, wherein X is at least one anionic species selected from halide, nitrate, sulfate, carbonate, and bicarbonate; M is at least one oxophilic transition metal atom, and/or at least one oxophilic main group metal atom selected from aluminum, gallium, indium, silicon, germanium, and tin; and z is independently 2, 3, or 4, depending on the metal atom M; provided that, if M is exclusively aluminum, then the solid particulate composition further includes M'(OH)$_z$ units, either in the same framework structure comprising LiX and M(OH)$_z$ units or in a separate framework structure comprising LiX and M'(OH)$_z$ units, wherein M' is at least one oxophilic transition metal atom and/or at least one oxophilic main group metal atom selected from gallium, indium, silicon, germanium, and tin.

In second particular embodiments, the composition is represented by the following chemical formula:

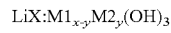

LiX:M1$_{x-y}$M2$_y$(OH)$_3$ wherein X is at least one anionic species; M1 is at least one oxophilic main group metal atom selected from aluminum, gallium, and indium; and M2 is at least one oxophilic transition metal atom, and/or at least one oxophilic main group metal atom selected from aluminum, gallium, indium, silicon, germanium, and tin, provided that M1 and M2 are different; x is at least 1 and up to 1.5; and y is at least 0.1x and up to or less than x.

In another aspect, the invention is directed to a method for extracting and recovering a lithium salt from an aqueous solution. The method includes: (a) flowing an aqueous solution containing a lithium salt (i.e., "source solution") through a packed bed of solid particles having any of the above solid particulate compositions; and (b) recovering lithium salt extracted in step (a) from the packed bed of solid particles by washing the packed bed of solid particles with an aqueous washing solution containing the lithium salt in a concentration of no more than 50% of the concentration of lithium salt in the aqueous (source) solution containing the lithium salt. The aqueous washing (stripping) solution is generally substantially bereft of metal ions other than lithium ions. In some embodiments, the method further includes, prior to step (a), a primer washing step wherein the packed bed of solid particles are washed with a primer aqueous solution containing up to 500 ppm of the lithium salt in order to ensure that the packed bed of solid particles possess vacant sites for uptake of lithium ions. In other embodiments, the method further comprises an intermediate washing step after step (a) and before step (b) for removing an inter-particle volume of the aqueous source solution containing lithium salt, wherein the washing step includes washing the packed bed of solid particles with an intermediate aqueous solution having a salt concentration of at least 10 wt. % (e.g., of a lithium and/or sodium salt) to prevent unloading of lithium ions from the packed bed during the washing step.

DETAILED DESCRIPTION OF THE INVENTION

Figure 1:
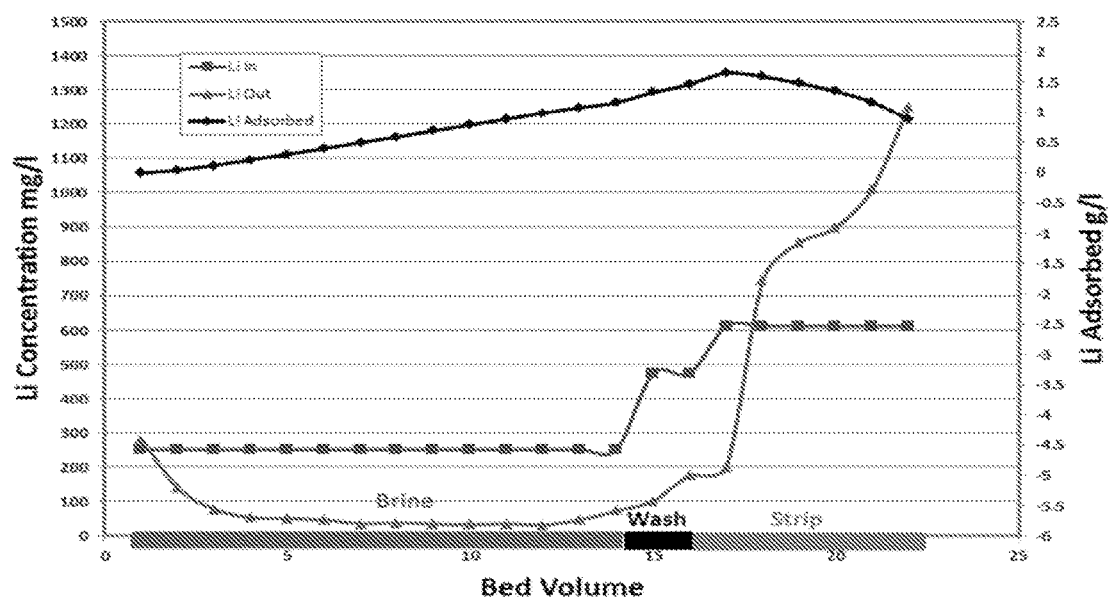
FIG. 1. A graph plotting lithium extraction capacity results for $LiCl:Al_{1.25}Fe_{0.25}(OH)_3$, also referred to as "Fe-doped LDH", where LDH=layered double hydroxide and refers to undoped $LiCl:Al_{1.5}(OH)_3$.

In a first aspect, the invention is directed to solid particulate compositions useful in extracting a lithium salt from aqueous solutions. The composition includes lithium (i.e., as lithium ions), metal atoms (i.e., other than lithium, typically in a cationic state), oxygen atoms, and an (i.e., at least one) anionic species (X) selected from halide (e.g., fluoride, chloride, bromide, or iodide), nitrate ($NO_3^-$), sulfate ($SO_4^{2-}$), carbonate ($CO_3^{2-}$), and bicarbonate ($HCO_3^-$), all in a framework structure. The oxygen atoms may, in some embodiments, be in the form of oxide ions ($O^{2-}$), as in a zeolitic structure. In other embodiments, the oxygen atoms are present as hydroxide (OH) groups, or as both oxide and hydroxide groups, as in aluminum hydroxide, aluminum oxyhydroxide, and aluminosilicate structures (e.g., kaolinite).

The term "framework structure," as used herein and as well recognized in the art, refers to a network structure (e.g., one-, two-, or three-dimensional) in which components in the structure are interconnected by, for example, covalent and/or ionic bonds, in analogous fashion to zeolites and metal-organic frameworks (MOFs), both of which are well known in the art. The oxygen atoms, whether as oxide or hydroxide groups, are typically bound to at least the metal atoms in such structures.

The term "particulate," as used herein, refers to the presence of particles or pellets made of the above-described composition. Generally, the particles or pellets have a size of at least 0.01 micron. In different embodiments, the particles or pellets have a size of about, at least, above, up to, or less than, for example, 0.1, 0.5, 1, 2, 5, 10, 50, 100, 150, 200, 300, 400, 500, 1000, 2000, or 5000 microns. The term "about," as used herein, generally indicates a deviation of no more than 10%, 5%, or 1% from a given value. Thus, the term "about 100 microns" may indicate, within its broadest interpretation, a value in the range of 90-110 microns.

In the particulate composition, the metal atoms are selected from at least one (i.e., one, two, or more) of oxophilic main group metal atoms and/or oxophilic transition metal atoms. The term "metal atom," as used herein, indicates the presence of metal atoms in a cationic state, as distinguished from a bulk metal in the zerovalent state.

In one embodiment, the particulate composition contains at least one (i.e., one, two, or more) oxophilic main group metal atom. The oxophilic main group metals generally include the elements in Groups 13-16 of the Periodic Table. Some examples of oxophilic main group metals include boron, aluminum, gallium, indium, silicon, germanium, tin, lead, arsenic, antimony, bismuth, selenium, and tellurium. The particulate composition may or may not also include one or more oxophilic transition metal atoms.

In another embodiment, the particulate composition contains at least one oxophilic transition metal atom. The oxophilic transition metals generally include the elements in Groups 3-12 of the Periodic Table. Some examples of oxophilic transition metals include scandium, titanium, vanadium, chromium, manganese, iron, cobalt, nickel, copper, zinc, yttrium, zirconium, and niobium. The particulate composition may or may not also include one or more oxophilic main group metal atoms.

In other embodiments, the particulate composition contains at least one oxophilic main group metal and at least one oxophilic transition metal. For example, in some embodiments, the particulate composition includes at least one of boron, aluminum, gallium, or indium, along with at least one of titanium, vanadium, chromium, manganese, iron, cobalt, nickel, copper, or zinc. In other embodiments, the particulate composition includes at least one of aluminum or gallium as a main group metal and at least one of any one, two, or more of the exemplary transition metals provided above.

In some embodiments, the particulate composition excludes one or more classes or specific types of metal atoms provided above. In particular embodiments, the composition may exclude aluminum, or may exclude Group 13 and/or Group 14 metals, or may exclude all main group metals.

According to the invention, if the metal atoms within a framework structure of the composition include aluminum atoms, then the composition includes at least one metal other than aluminum and selected from oxophilic main group and/or oxophilic transition metal atoms provided above, other than aluminum. The at least one metal other than aluminum may be within the same framework structure, in which case the composition is single-phase, or the at least one metal other than aluminum may be within at least one other framework structure within the same composition, in which case the composition is two-phase or a higher phase, depending on the number of discrete framework structures. In the event that the at least one metal other than aluminum is within the same framework structure, generally at least 10 mol % of the aluminum atoms are substituted with at least one metal atom selected from any one or more of the oxophilic main group and/or oxophilic transition metal atoms provided above, other than aluminum. In particular embodiments, at least 10 mol % of the aluminum atoms are substituted with at least one oxophilic transition metal (e.g., one or two of chromium, manganese, iron, cobalt, nickel, copper, or zinc) and/or at least one oxophilic main group metal that is not aluminum (e.g., one or two of boron, gallium, or indium). In some embodiments, about, at least, above, up to, or less than, for example, 15, 20, 25, 30, 35, 40, 45, 50, 60, 70, 80, 90, or 95 mol % of the aluminum atoms are substituted with one or more metal atoms other than aluminum, as provided above. In other embodiments, if the metal atoms include boron, gallium, or indium, then at least 10 mol % of the boron, gallium, or indium atoms are substituted with at least one metal atom selected from any one or more of the oxophilic main group and/or oxophilic transition metal atoms provided above, other than boron, gallium, or indium.

In the particulate composition, the lithium is present in an amount less than a saturated amount in order to permit extraction of lithium salt from the aqueous solution. For example, if the saturation amount is represented by the value w, then lithium is present in an amount less than w, such as 10%, 20%, 30%, 40%, 50%, 60%, 70%, 80%, or 90% of w.

In a first particular set of embodiments, the particulate composition includes a framework structure containing LiX and $M(OH)_z$ units, wherein X is at least one anionic species selected from halide, nitrate, sulfate, carbonate, and bicarbonate; M is at least one (e.g., one, two, or three) oxophilic metal atoms, such as at least one oxophilic transition metal atom, and/or at least one oxophilic main group metal atom selected from aluminum, gallium, indium, silicon, germanium, and tin; and z is independently 2, 3, or 4, depending on the metal atom M. In the particulate composition, if M is exclusively aluminum, then the solid particulate composition further includes $M'(OH)_z$ units, either in the same framework structure containing LiX and $M(OH)_z$ units (i.e., as single-phase) or in a separate framework structure comprising LiX and $M'(OH)_z$ units (i.e., as two-phase), wherein M' is a metal that is not aluminum. M' can be, for example, at least one oxophilic transition metal atom and/or at least one oxophilic main group metal atom selected from gallium, indium, silicon, germanium, and tin.

In the event that M represents a single metal and does not include aluminum, then the particulate composition may be a framework structure containing only LiX and $M(OH)_z$ units, in which case the composition is single-phase. In particular embodiments, the single-phase composition contains LiX and $M(OH)_z$ units wherein M is a transition metal, such as a metal selected from V, Cr, Mn, Fe, Co, Ni, Cu, or Zn, in the absence of M being Al, or in the absence of M being any one or more of gallium, indium, silicon, germanium, and tin. For example, the single-phase composition may be composed of LiX (e.g., LiCl) and $Fe(OH)_3$ units, in the absence of M being Al, or in the absence of M being any one or more of gallium, indium, silicon, germanium, and tin. In the event that M represents at least two metals and does not include aluminum, then the particulate composition may be a single-phase framework structure containing LiX and equivalent $M(OH)_z$ units (with each M being at least two metals that are not aluminum) or the particulate composition may be two-phase by containing different framework structures with different $M(OH)_z$ units having two different M metals that are not aluminum. In the event that M represents aluminum and at least one other metal, then the particulate composition may be a single-phase framework structure containing the LiX and equivalent $M(OH)_z$ units (wherein M contains Al and at least one other metal, which may be, for example, one or more transition metals and/or main group metals, as provided above) or the particulate composition may be two-phase by containing different framework structures with different $M(OH)_z$ units. In the case of a two-phase composition, the two-phase composition may be a mixture of LiX and at least two different types of $M(OH)_z$ units, which may or may not include Al, and which may exclude one or more of any of the transition metals and/or main group metals provided above. For example, the two-phase composition may include LiX units within a mixture of $Al(OH)_3$ units and $M(OH)_z$ units, or more particularly, within a mixture of $Al(OH)_3$ units and $M(OH)_3$ units, with M being one or more transition metals, such as Fe or Fe in combination with another transition metal or a main group metal (e.g., $Al(OH)_3$ units in admixture with $Fe(OH)_3$ or $Fe_{x-y}M_y(OH)_z$ units). Moreover, in the foregoing example, the $Al(OH)_3$ units may or may not be replaced with or be in further combination with $M(OH)_z$ units taking M as one or more metals selected from gallium, indium, silicon, germanium, and tin.

Alternatively, the Al in any of the foregoing embodiments may be partially substituted with one or more transition metals and/or main group metals, which may result in, for example, $Al_{x-y}Ga_y(OH)_3$ or $Al_{x-y}Fe_y(OH)_3$ units. In some embodiments, three or more distinct types of $M(OH)_z$ units form a three-phase or higher-phase framework composition.

In a second particular set of embodiments, the particulate composition has a composition according to the following chemical formula:

$$LiX:M1_{x-y}M2_y(OH)_3 \quad (1)$$

In the above Formula (1), X is an anionic species as provided above, i.e., selected from halide, nitrate, sulfate, carbonate and bicarbonate. One, two, or more of the foregoing anionic species may be included within the variable X. In some embodiments, X is a halide, particularly chloride. The variable M1 represents at least one oxophilic main group metal atom selected from aluminum, gallium, and indium; and M2 is at least one oxophilic transition metal atom (e.g., V, Cr, Mn, Fe, Co, Ni, Cu, or Zn), as provided above, and/or at least one oxophilic main group metal atom, as provided above, particularly those selected from aluminum, gallium, indium, silicon, germanium, and tin, provided that M1 and M2 are different. The variable x is at least 1, 1.1, or 1.2 and up to 1.3, 1.4, or 1.5, or the variable x may be precisely any of the foregoing values or within a range bounded by any two of the foregoing values. The variable y is at least 0.1x and up to or less than x. The variable y can be, for example, precisely or at least 0.1x, 0.2x, 0.3x, 0.4x, 0.5x, 0.6x, 0.7x, 0.8x, or 0.9x, and up to or less than x, or y can be within a range bounded by any two of the foregoing values. Moreover, although three hydroxy groups are shown in Formula (1), it should be appreciated that the molar amount of hydroxy groups may be in a fractional amount above or below 3, depending on the nature and relative amount of the M2 species. Thus, the above Formula (1) and sub-formulas are intended to also encompass compositions of the following types, for example: $LiX:M1_{x-y}M2_y(OH)_{2.5}$, $LiX:M1_{x-y}M2_y(OH)_{2.8}$, $LiX:M1_{x-y}M2_y(OH)_{2.9}$, $LiX:M1_{x-y}M2_y(OH)_{3.1}$, $LiX:M1_{x-y}M2_y(OH)_{3.2}$, and $LiX:M1_{x-y}M2_y(OH)_{3.5}$.

In particular embodiments of Formula (1), M1 is or includes aluminum, which corresponds to the following sub-formula:

$$LiX:Al_{x-y}M2_y(OH)_3 \quad (1-1)$$

In one set of embodiments in Formula (1-1), M2 is at least one oxophilic transition metal atom, as provided above. Some examples of compositions wherein M2 is iron (Fe) and x is 1 include $LiX:Al_{0.9}Fe_{0.1}(OH)_3$, $LiX:Al_{0.8}Fe_{0.2}$ $(OH)_3$, LiX:$Al_{0.7}Fe_{0.3}(OH)_3$, LiX:$Al_{0.6}Fe_{0.4}(OH)_3$, LiX:$Al_{0.5}Fe_{0.5}(OH)_3$, LiX:$Al_{0.4}Fe_{0.6}(OH)_3$, LiX:$Al_{0.3}Fe_{0.7}(OH)_3$, LiX:$Al_{0.2}Fe_{0.8}(OH)_3$, LiX:$Al_{0.1}Fe_{0.9}(OH)_3$, and LiX:Fe$(OH)_3$. Some examples of compositions wherein M2 is Fe and x is 1.2 include LiX:$Al_{1.1}Fe_{0.1}(OH)_3$, LiX:$AlFe_{0.2}(OH)_3$, LiX:$Al_{0.9}Fe_{0.3}(OH)_3$, LiX:$Al_{0.8}Fe_{0.4}(OH)_3$, LiX:$Al_{0.7}Fe_{0.5}(OH)_3$, LiX:$Al_{0.6}Fe_{0.6}(OH)_3$, LiX:$Al_{0.5}Fe_{0.7}(OH)_3$, LiX:$Al_{0.4}Fe_{0.8}(OH)_3$, LiX:$Al_{0.3}Fe_{0.9}(OH)_3$, LiX:$Al_{0.2}Fe(OH)_3$, and LiX:$Al_{0.1}Fe_{1.1}(OH)_3$. Some examples of compositions wherein M2 is Fe and x is 1.5 include LiX:$Al_{1.4}Fe_{0.1}(OH)_3$, LiX:$Al_{1.3}Fe_{0.2}(OH)_3$, LiX:$Al_{1.2}Fe_{0.3}(OH)_3$, LiX:$Al_{1.1}Fe_{0.4}(OH)_3$, LiX:$AlFe_{0.5}(OH)_3$, LiX:$Al_{0.9}Fe_{0.6}(OH)_3$, LiX:$Al_{0.8}Fe_{0.7}(OH)_3$, LiX:$Al_{0.7}Fe_{0.8}(OH)_3$, LiX:$Al_{0.6}Fe_{0.9}(OH)_3$, LiX:$Al_{0.5}Fe(OH)_3$, LiX:$Al_{0.4}Fe_{1.1}(OH)_3$, LiX:$Al_{0.3}Fe_{1.2}(OH)_3$, LiX:$Al_{0.2}Fe_{1.3}(OH)_3$, and LiX:$Al_{0.1}Fe_{1.4}(OH)_3$. Several other exemplary compositions are possible, including those in which Fe in any of the preceding examples is replaced with V, Cr, Mn, Fe, Co, Ni, Cu, or Zn, or those in which Al in ay of the preceding examples is replaced with B, Ga, or In. In some embodiments, M2 represents more than one transition metal, as exemplified by, for example, LiX:$Al_{0.8}Fe_{0.1}Ni_{0.1}(OH)_3$, LiX:$Al_{0.8}Fe_{0.1}Co_{0.1}(OH)_3$, LiX:$Al_{0.8}Fe_{0.1}Zn_{0.1}(OH)_3$, LiX:$Al_{0.8}Ni_{0.1}Co_{0.1}(OH)_3$, LiX:$Al_{0.8}Ni_{0.1}Fe_{0.1}(OH)_3$, LiX:$Al_{1.2}Fe_{0.2}Ni_{0.1}(OH)_3$, LiX:$Al_{1.2}Fe_{0.2}Co_{0.1}(OH)_3$, LiX:$Al_{1.2}Fe_{0.2}Zn_{0.1}(OH)_3$, LiX:$Al_{1.2}Ni_{0.2}Co_{0.1}(OH)_3$, and LiX:$Al_{1.2}Ni_{0.2}Fe_{0.1}(OH)_3$.

In another set of embodiments in Formula (1-1), M2 is at least one oxophilic main group metal atom, as provided above. Some examples of compositions wherein M2 is gallium (Ga) and x is 1 include LiX:$Al_{0.9}Ga_{0.1}(OH)_3$, LiX:$Al_{0.8}Ga_{0.2}(OH)_3$, LiX:$Al_{0.7}Ga_{0.3}(OH)_3$, LiX:$Al_{0.6}Ga_{0.4}(OH)_3$, LiX:$Al_{0.5}Ga_{0.5}(OH)_3$, LiX:$Al_{0.4}Ga_{0.6}(OH)_3$, LiX:$Al_{0.3}Ga_{0.7}(OH)_3$, LiX:$Al_{0.2}Ga_{0.8}(OH)_3$, LiX:$Al_{0.1}Ga_{0.9}(OH)_3$, and LiX:Ga$(OH)_3$. Some examples of compositions wherein M2 is Ga and x is 1.2 include LiX:$Al_{1.1}Ga_{0.1}(OH)_3$, LiX:$AlGa_{0.2}(OH)_3$, LiX:$Al_{0.9}Ga_{0.3}(OH)_3$, LiX:$Al_{0.8}Ga_{0.4}(OH)_3$, LiX:$Al_{0.7}Ga_{0.5}(OH)_3$, LiX:$Al_{0.6}Ga_{0.6}(OH)_3$, LiX:$Al_{0.5}Ga_{0.7}(OH)_3$, LiX:$Al_{0.4}Ga_{0.8}(OH)_3$, LiX:$Al_{0.3}Ga_{0.9}(OH)_3$, LiX:$Al_{0.2}Ga(OH)_3$, and LiX:$Al_{0.1}Ga_{1.1}(OH)_3$. Some examples of compositions wherein M2 is Ga and x is 1.5 include LiX:$Al_{1.4}Ga_{0.1}(OH)_3$, LiX:$Al_{1.3}Ga_{0.2}(OH)_3$, LiX:$Al_{1.2}Ga_{0.3}(OH)_3$, LiX:$Al_{1.1}Ga_{0.4}(OH)_3$, LiX:$AlGa_{0.5}(OH)_3$, LiX:$Al_{0.9}Ga_{0.6}(OH)_3$, LiX:$Al_{0.8}Ga_{0.7}(OH)_3$, LiX:$Al_{0.7}Ga_{0.8}(OH)_3$, LiX:$Al_{0.6}Ga_{0.9}(OH)_3$, LiX:$Al_{0.5}Ga(OH)_3$, LiX:$Al_{0.4}Ga_{1.1}(OH)_3$, LiX:$Al_{0.3}Ga_{1.2}(OH)_3$, LiX:$Al_{0.2}Ga_{1.3}(OH)_3$, and LiX:$Al_{0.1}Ga_{1.4}(OH)_3$. Several other exemplary compositions are possible, including those in which Ga in any of the preceding examples is replaced with B, In, Si, Ge, or Sn. In some embodiments, M2 represents more than one main group metal, as exemplified by, for example, LiX:$Al_{0.8}Ga_{0.1}In_{0.1}(OH)_3$, LiX:$Al_{0.8}Ga_{0.1}Si_{0.1}(OH)_3$, or LiX:$Al_{0.8}Ga_{0.1}Sn_{0.1}(OH)_3$. In yet other embodiments, M2 includes at least one oxophilic main group metal and at least one oxophilic transition metal, as exemplified by, for example, LiX:$Al_{1.2}Fe_{0.2}Ga_{0.1}(OH)_3$, LiX:$Al_{1.1}Fe_{0.2}Ga_{0.1}In_{0.1}(OH)_3$, LiX:$Al_{1.2}Fe_{0.1}Ni_{0.1}Ga_{0.1}(OH)_3$, and LiX:$Al_{1.1}Fe_{0.1}Ni_{0.1}Ga_{0.1}In_{0.1}(OH)_3$.

In the above Formulas (1) and (1-1), M1 or M2 may or may not also include one or more alkaline earth metals. Some examples of such compositions include LiX:$Al_{1.2}Fe_{0.2}Mg_{0.1}(OH)_3$, LiX:$Al_{0.5}Fe_{0.5}Mg_{0.5}(OH)_3$, LiX:$Al_{0.3}Fe_{0.7}Mg_{0.5}(OH)_3$, LiX:$Al_{1.2}Fe_{0.2}Ca_{0.1}(OH)_3$, LiX:$Al_{1.1}Fe_{0.2}Zn_{0.1}Mg_{0.1}(OH)_3$, LiX:$Al_{1.1}Fe_{0.2}Mg_{0.1}Ca_{0.1}(OH)_3$, LiX:$Al_{1.2}Ga_{0.2}Mg_{0.1}(OH)_3$, LiX:$Al_{0.8}In_{0.5}Mg_{0.2}(OH)_3$, LiX:$Al_{0.9}In_{0.4}Fe_{0.1}Mg_{0.1}(OH)_3$, and LiX:$Fe_{0.9}Mg_{0.1}(OH)_3$.

The above-described particulate compositions according to Formulas (1) and (1-1) can be produced according to well-known methodology, except that the method described herein is distinguished by including precursor components that result in the novel compositions described above. For example, while it is well known in the conventional art to produce LiX/$Al(OH)_3$ compositions by reaction of LiOH and $Al(OH)_3$ in the presence of dilute amounts of HCl (e.g., U.S. Pat. Nos. 8,309,043 and 6,280,693), the method described herein can achieve the compositions described herein by reacting LiOH and $Al(OH)_3$, along with a metal salt containing a metal corresponding to M2 and that is soluble in the aqueous solution (e.g., $FeSO_4$, $Fe(CH_3COO)_2$, $FeCl_2$, $COSO_4$, and $NiSO_4$) in the presence of dilute HCl.

The particulate composition may alternatively have a zeolitic type of structure, except that, for purposes of the present invention, the zeolitic material includes lithium atoms and at least one metal atom (e.g., M1 and/or M2). As well known in the art, a zeolite typically includes a microporous framework constructed of interconnected metal and oxide atoms. A large number of zeolites have an aluminosilicate composition. Typically, the zeolite is ordered by having a crystalline or partially crystalline structure. The zeolite can generally be described as a three-dimensional framework containing silicate ($SiO_2$ or $SiO_4$) and/or aluminate ($Al_2O_3$ or $AlO_4$) units that are interconnected (i.e., crosslinked) by the sharing of oxygen atoms. The zeolite can be, for example, a MFI-type zeolite, MEL-type zeolite, MTW-type zeolite, MCM-type zeolite, BEA-type zeolite, kaolin, or a faujasite-type of zeolite. Some particular examples of zeolites include the ZSM class of zeolites (e.g., ZSM-5, ZSM-8, ZSM-11, ZSM-12, ZSM-15, ZSM-23, ZSM-35, ZSM-38, ZSM-48), zeolite X, zeolite Y, zeolite beta, and the MCM class of zeolites (e.g., MCM-22 and MCM-49). The compositions, structures, and properties of these zeolites are well-known in the art, and have been described in detail, as found in, for example, U.S. Pat. Nos. 4,721,609, 4,596,704, 3,702,886, 7,459,413, and 4,427,789, the contents of which are incorporated herein by reference in their entirety. The incorporation of lithium atoms and other metals into zeolites can be achieved by utilizing methodology well known in the art, such as any of the zeolite impregnation, ion exchange, or synthetic processes known in the art, as provided in, for example, U.S. Pat. No. 6,780,806, the contents of which are incorporated herein by reference in their entirety. Some additional examples of zeolitic compositions considered herein include sodalite (e.g., $Na_8(Al_6Si_6O_{24})Cl_2$) and $Li_8(AlSiO_4)_6Cl_2$, wherein Al may be partially or completely replaced by one or more metal atoms, such as provided above for M1 and M2, particularly Ga and In; and wherein the Si may be partially or completely replaced by one or more metal atoms, such as provided above for M1 and M2, particularly Ge and Sn.

For purposes of the invention, the particulate composition, whether according to Formulas (1) or (1-1) or a zeolite, should include vacant sites for absorption of lithium ions for the purpose of extracting the lithium salt. The vacant sites may be introduced during synthesis, or alternatively, as a post-processing step, prior to contact with the aqueous source solution. To ensure the presence of vacant sites, the mole fraction of Li to the metal(s), or more particularly Li to Al, should be less than 1, and more typically a mole fraction of up to or less than 0.8, 0.7, 0.6, 0.5, 0.4, 0.3, 0.2, or 0.1, or a mole fraction within a range bounded by any two of the foregoing values. The ratio of lithium to metal (e.g., lithium to aluminum) is critical in stabilizing the structural form of the material and maximizing the number of lithium sites available in the matrix for the loading and unloading of lithium from the aqueous source solution.

In another aspect, the invention is directed to a method of extracting a lithium salt from an aqueous source solution containing the lithium salt, by extracting the lithium salt into the above-described particulate composition and releasing and recovering the lithium salt from the particulate composition. The aqueous source solution can be any aqueous solution containing a lithium salt, which may be either in the absence or presence of other metal salt species (e.g., sodium, potassium, magnesium, and/or calcium salt species). The aqueous source solution is typically natural brine, such as a continental, geothermal, or oilfield geothermal brine solution. However, the aqueous source solution may also be completely anthropogenic, such as a solution emanating from a lithium waste recovery process, such as may occur in a lithium battery recycling process. The lithium can be present in any concentration in the aqueous source solution, typically in an amount of at least 0.1M concentration. In different embodiments, the lithium is present in a concentration of at least or above 0.1, 0.2, 0.5, 1, 2, 3, 4, 5, 6, 7, 8, 9, or 10M concentration, or in a concentration within a range bounded by any two of the foregoing values. Moreover, in some embodiments, the aqueous source solution is processed in its original or unadulterated state, whereas, in other embodiments, the aqueous source solution is concentrated in order to attain a higher concentration of lithium, or other salt species are added or removed prior to the instantly described process to improve aspects of the process.

In the process, the aqueous source solution is first passed (i.e., flowed) through a packed bed of the above-described particulate composition, whether according to Formulas (1) or (1-1) or a specialized zeolite. The foregoing flowing step is hereinafter also referred to as "step (a)". To permit flow, the particles or pellets of the composition should be packed with a reasonable degree of freedom so as to include sufficient interparticle spacing to accommodate the flow of a liquid through the bed of particulate composition. The flowing step can be conducted by any suitable means, as well known in the art, including flowing the aqueous source solution in a downflow mode or an upflow mode. During passage of the aqueous source solution, lithium from the source solution is largely selectively extracted from the source solution into particles of the particulate composition while the remainder of the source solution resides in inter-particle spacings of the particulate composition. If non-lithium salt species (e.g., sodium, potassium, magnesium, and/or calcium) are also included in the source solution, the non-lithium salt species will remain substantially or completely unabsorbed and reside in the inter-particle volume of the particulate composition occupied by the source solution.

Following the flowing step described above, the lithium salt absorbed (i.e., captured) in the particulate composition is recovered by washing the packed bed of particulate composition with an aqueous washing (stipping) solution containing lithium salt (same or different from the lithium salt in the source solution) in a concentration of no more than or less than 50 wt % of the concentration of lithium in the starting aqueous source solution. The use of lithium salt in the wash solution is to prevent the collapse of the structure of particulate composition. The foregoing recovery (i.e., "strip") step is hereinafter also referred to as "step (b)," or it can also be referred to as the "recovery step". In order to obtain lithium salt with minimal presence of other non-lithium salt species, the washing solution in the strip/recovery step (b) should be substantially bereft of metal ions (metal salts) other than lithium salts (lithium ions). Thus, the washing solution in step (b), before flowing through the particulate composition, should contain a lithium salt dissolved in water in the substantial absence of any other dissolved species. The lower lithium concentration in the washing solution in step (b) provides the driving force for desorption of lithium salt from the particulate composition and into the wash. In different embodiments, the washing solution in step (b) contains lithium salt, and independently, total salt, in a concentration of up to or less than 50, 40, 30, 20, 10, or 5 wt % of the concentration of total salts in the starting aqueous source solution. The washing solution in step (b), once passed through the particulate composition, may be further processed to further isolate or separate the lithium salt contained therein. For example, the spent wash may be concentrated, and the concentrated contents precipitated and/or crystallized and recrystallized.

If the washing/stripping solution in step (b) is passed through the bed of particulate composition directly after flowing the aqueous source solution, the washing/stripping solution will carry with it any of the non-lithium (i.e., contaminant) species that may be present in the aqueous source solution residing in the inter-particle volume of the particulate composition. In view of this, and in an effort to obtain the lithium salt in purer form, an intermediate washing step may be employed after flowing the source solution, in step (a), and before the recovery (washing/strip) step, in step (b). In some embodiments, an intermediate washing step is not employed.

The intermediate washing step employs an aqueous intermediate washing solution. The purpose of the intermediate washing solution is to wash away aqueous source solution residing in the inter-particle volume of the particulate composition after step (a) without removing lithium absorbed in the particles. To accomplish this, the intermediate washing solution should have a sufficiently high salt concentration, generally, at least 10 wt %, to substantially prevent unloading of lithium ions from the packed bed during the washing step. In different embodiments, the salt concentration in the intermediate washing solution is at least or above 10, 15, 20, 25, or 30 wt %. The salt in the intermediate washing solution may include, for example, a lithium salt and/or sodium salt. Since most brines contain a high concentration of sodium salts, sodium salt in the intermediate washing solution generally does not represent a new contaminant to be removed. The sodium salt in the intermediate washing solution is mainly used to remove calcium and magnesium salts, which would otherwise require chemical treatment to remove them, whereas sodium salt is generally easier to remove, typically by crystallizing out during the concentration of the lithium salt stream.

In some embodiments, prior to flowing the aqueous source through the particulate composition in step (a), the packed bed of solid particles are washed with a primer aqueous solution containing up to 500 ppm of lithium in order to ensure that the packed bed of solid particles possesses sufficient vacant sites for uptake of lithium ions from the source solution. The lithium salt contained in the primer solution may be the same or different than the lithium salt in the source solution. In different embodiments, the primer solution contains up to or less than, for example, 500, 400, 300, 200, or 100 ppm of lithium ions.

Examples have been set forth below for the purpose of illustration and to describe certain specific embodiments of the invention. However, the scope of this invention is not to be in any way limited by the examples set forth herein.

EXAMPLES

Preparation of $LiCl:Al_{1.25}Fe_{0.25}(OH)_3$, (Also Referred to as "Fe-Doped LDH", where LDH=Layered Double Hydroxide and Refers to $LiCl:Al_{1.5}(OH)_3$)

Iron (II) hydroxide was prepared by precipitation of 6.95 g of FeSO$_4$.7H$_2$O in an excess amount of NH$_4$OH with stirring in a beaker. The reaction was completed overnight. The clear aqueous layer was removed with a plastic dropper in an effort to remove the sulfate ions. The remaining dark green slurry was washed with DI water twice. A small residue of iron (III) hydroxide (red precipitate) was present in the slurry.

The beaker containing hydroxides of iron was placed in a preheated oil bath at 95° C. An amount of 4.2 g of LiOH.H$_2$O and 9.751 g of Al(OH)$_3$ were added directly to the beaker, and sufficient DI water (~75 mL) was added to about the two-third mark of the beaker. The reaction was complete after 48 hours, and the beaker was then removed from the heat source. A molar amount of HCl equivalent to the molar amount of lithium was added dropwise to the solution. The reaction was complete in 2 hours. The product was washed with DI water with a vacuum filter system, and was air dried overnight. The solid was placed in a dry vacuum oven at 120° C. The final product was ground to a coffee colored powder for characterization and analysis.

Bench-Scale Column Verification

The lithium extraction capacity of the Fe-doped LDH was measured by the column verification method. The results are presented in FIG. 1. As shown by FIG. 1, the Li absorption capacity of Fe-doped LDH is nearly 1.6 g/L, which is slightly lower than undoped LDH, which was measured to be around to be 3.5 g/L.

Comparison of Selectivity to Li Over Na and K for LDH and Fe-Doped LDH Sorbents

Figure 2:
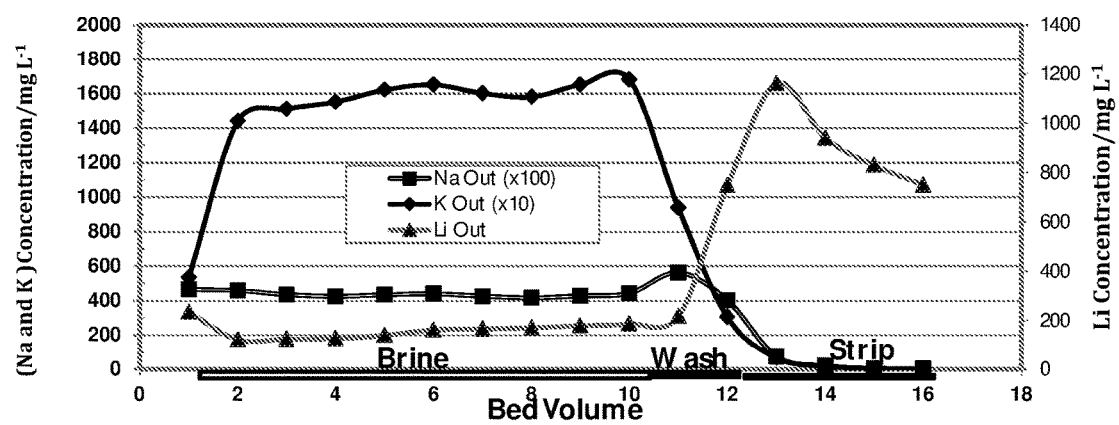
FIG. 2. A graph plotting Na, K and Li concentrations after loading brine, wash, and strip solutions in the undoped LDH sorbent.
Figure 3:
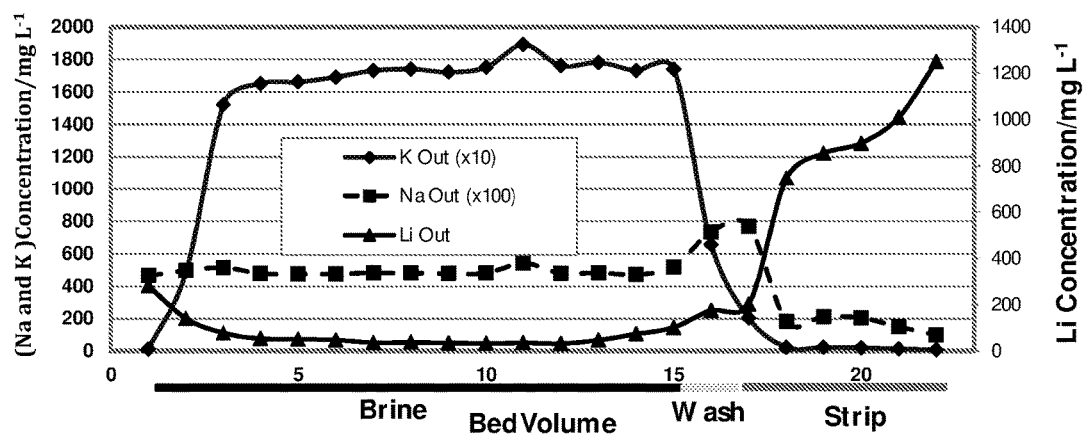
FIG. 3. A graph plotting Na, K and Li concentrations after loading brine, wash, and strip solutions in the Fe-doped LDH sorbent.

FIG. 2. is a graph plotting Na, K and Li concentrations after loading brine, wash, and strip solutions in the undoped LDH sorbent. FIG. 3 is a graph plotting Na, K and Li concentrations after loading brine, wash, and strip solutions in the Fe-doped LDH sorbent. Referring to FIGS. 2 and 3, it is evident that the LDH sorbent is still relatively more selective to Li over Na and K than Fe-doped LDH. While the Na concentration after running the strip solution is almost zero for the LDH, it plateaus to ≈150 mg/L after the strip solution. There is moderate amount of Li extraction after the strip solution for the two sorbents. The selectivity for K is slightly improved for Fe-doped LDH than the undoped LDH. It is also possible to use the concentration of the eluate solution (which includes analytes and solutes) from the washing/strip step (b) as the feed and use the particulate composition in a column and further purify the lithium salts by separating sodium and potassium salts. In addition, a membrane approach where a polymer support is embedded with the particulate composition may also be used for this process. Still further, the process described above may be used in combination with metal-binding ligands, such as LiX® 54 and Cyanex® 923, typically used in solvent extraction, for further purification of the strip solution.

While there have been shown and described what are at present considered the preferred embodiments of the invention, those skilled in the art may make various changes and modifications which remain within the scope of the invention defined by the appended claims.

What is claimed is:

1. A solid particulate composition useful in extracting a lithium salt from aqueous solutions, wherein the composition is a framework structure comprising LiX, M(OH)$_z$ units, and M'(OH)$_z$ units, wherein X is at least one anionic species selected from halide, nitrate, sulfate, carbonate, and bicarbonate; M is selected from aluminum, gallium, and indium; M' is iron, and z is independently 2, 3, or 4, wherein M' is present in an amount of at least 10 mol % of M but less than the molar amount of M.

2. The composition of claim 1, wherein said at least one anionic species X is selected from halide atoms.

3. The composition of claim 1, wherein said composition is represented by the following chemical formula:

$$\text{LiX:M1}_{x-y}\text{M2}_y(\text{OH})_3 \quad (1)$$

wherein X is at least one anionic species selected from halide, nitrate, sulfate, carbonate, and bicarbonate; M1 is at least one oxophilic main group metal atom selected from aluminum, gallium, and indium; and M2 is iron; x is at least 1 and up to 1.5; y is at least 0.1x and less than x; and the species Li, X, M1, and M2 in Formula (1) are within a framework structure.

4. The composition of claim 3, wherein M1 comprises aluminum.

5. A method of extracting and recovering a lithium salt from an aqueous source solution containing said lithium salt, the method comprising:

(a) flowing said aqueous source solution containing lithium salt through a packed bed of solid particles having a composition that is a framework structure comprising LiX, M(OH)$_z$ units, and M'(OH)$_z$ units, wherein X is at least one anionic species selected from halide, nitrate, sulfate, carbonate, and bicarbonate; M is selected from aluminum, gallium, and indium; M' is iron, and z is independently 2, 3, or 4, wherein M' is present in an amount of at least 10 mol % of M but less than the molar amount of M, and wherein said lithium is present in said composition in an amount less than a saturated amount in order to permit extraction of said lithium salt from said aqueous solution containing lithium salt; and (b) recovering lithium salt extracted in step (a) from said packed bed of solid particles by washing said packed bed of solid particles with an aqueous washing solution containing the lithium salt in a concentration of no more than 50% of the concentration of the lithium salt in the aqueous source solution containing the lithium salt, and wherein said aqueous washing solution is substantially bereft of metal ions other than lithium ions.

6. The method of claim 5, wherein said composition is represented by the following chemical formula:

$$\text{LiX:M1}_{x-y}\text{M2}_y(\text{OH})_3 \quad (1)$$

wherein X is said anionic species; M1 is at least one oxophilic main group metal atom selected from aluminum, gallium, and indium; and M2 is iron; x is at least 1 and up to 1.5; and y is at least 0.1x and less than x; and the species Li, X, M1, and M2 in Formula (1) are within a framework structure.

7. The method of claim 6, wherein M1 comprises aluminum.

* * * * *